(12) United States Patent
Chen et al.

(10) Patent No.: US 7,415,961 B1
(45) Date of Patent: Aug. 26, 2008

(54) PISTON FOR INTERNAL COMBUSTION ENGINE, COMPRESSOR OR THE LIKE

(76) Inventors: Marina Ling Chen, 550 S. Hill St., Suite 913, Los Angeles, CA (US) 90013; Deheng Wang, Nanchang Road, #509, Lanzhou City, Gansu (CN)

( * ) Notice: Subject to any disclaimer, the term of this patent is extended or adjusted under 35 U.S.C. 154(b) by 0 days.

(21) Appl. No.: 11/701,581

(22) Filed: Feb. 1, 2007

(51) Int. Cl.
*F02F 3/00* (2006.01)
(52) U.S. Cl. ............... 123/200; 123/193.6; 92/158
(58) Field of Classification Search ... 123/41.34–41.39, 123/193.6, 193.1, 193.2; 92/158–160
See application file for complete search history.

(56) References Cited

U.S. PATENT DOCUMENTS

| | | | | |
|---|---|---|---|---|
| 1,336,342 | A | * | 4/1920 | Blankfield .................... 92/160 |
| 1,427,205 | A | * | 8/1922 | Grant ........................... 92/159 |
| 3,161,188 | A | * | 12/1964 | Liebel et al. ............. 123/41.39 |
| 4,280,455 | A | * | 7/1981 | Yamaguchi et al. ..... 123/196 M |
| 4,776,302 | A | * | 10/1988 | Hundertmark et al. ... 123/41.39 |
| 7,171,936 | B2 | * | 2/2007 | Rein et al. ................ 123/193.4 |

FOREIGN PATENT DOCUMENTS

| EP | 373516 A1 | * | 6/1990 |
|---|---|---|---|
| JP | 54116516 A | * | 9/1979 |
| JP | 58170840 A | * | 10/1983 |

* cited by examiner

*Primary Examiner*—Stephen K. Cronin
*Assistant Examiner*—Hyder Ali
(74) *Attorney, Agent, or Firm*—Raymond Y. Chan; David and Raymond Patent Firm (57) ABSTRACT

A piston for internal combustion engine, compressor or the like, includes a piston ring, a piston skirt having a piston skirt wall. One or more lubricant channels and reservoirs are provided on an outer surface of the piston skirt. Lubricant is conducted to an outer surface of a piston skirt of a piston through the lubricant channels which are communicating an inner surface of the piston skirt with the outer surface thereof. The lubricant is able to be reserved in the lubricant reservoirs provided on the outer surface of the piston skirt to maintain lubrication between the piston skirt and cylinder wall so as to reduce a friction between the cylinder and the piston skirt, reduce loss of power due to friction and heat, improve the output power, reduce the fuel consuming, noise and exhaust, and achieve fuel saving and environment protection.

16 Claims, 6 Drawing Sheets

PISTON FOR INTERNAL COMBUSTION ENGINE, COMPRESSOR OR THE LIKE

BACKGROUND OF THE PRESENT INVENTION

1. Field of Invention

This present invention relates to piston structure and more particularly to a piston for internal combustion engine, compressor or the like which is capable of reducing the friction between the piston and the cylinder wall and the method thereof.

2. Description of Related Arts

Piston is the "heart" of an internal combustion engine. It needs to withstand the alternating mechanical and thermal loads. As one of the key components of internal combustion engine it works in the toughest condition. A piston has to keep air pressure and transmit the force to a connecting rod through a pin to rotate a crankshaft. Since the piston works under high temperature, high pressure and high speed condition, it is badly heated but its heat removal effect is relatively low due to its inherent structure. Working under such severe circumstance will cause deformation and more friction, resulting in additional load and stress. It is essential to reserve the performance of bear-resisting, heat balance, alignment, and sealability in order to reduce the friction loss, fuel consumption, noise, and exhaust.

Although piston is always considered to be important during the development of internal combustion engine technique, the column friction loss between piston skirt and cylinder wall can't be sufficiently reduced due to the inherent structure. If the column area between piston skirt and cylinder wall is too small, it can't align the movement steadily; if the column area between piston skirt and cylinder wall is too big, it will increase friction loss. Currently the design of the column area has already been optimized. Since the space between piston skirt and cylinder wall is very small, the failure of forming a lubricant film during high speed movement is the major reason of deformation and heavy wear. As a result, the output power of the internal combustion engine is seriously affected.

SUMMARY OF THE PRESENT INVENTION

An object of the present invention is to provide a piston for internal combustion engine, compressor or the like that substantially reduces the power loss due to friction and heat, improve the output power, and reduce the power consuming, noise and exhaust.

Another object of the present invention is to constantly supply, collect, and reserve lubricant on the piston skirt, store and distribute sufficient lubricant in the clearance between piston skirt and cylinder wall, in order to reduce the friction. The result is to improve the output power of internal combustion engine, reduce the fuel consuming, noise and exhaust, and finally to achieve fuel saving and environment protection.

In order to accomplish the above objects, the present invention provides a method of reducing the friction between a piston and a cylinder wall of an internal combustion engine, a compressor or the like, comprising the steps of:

(a) conducting lubricant to an outer surface of a piston skirt of a piston through one or more lubricant channels communicating an inner surface of the piston skirt with the outer surface thereof; and (b) reserving lubricant in one or more lubricant reservoirs provided on the outer surface of the piston skirt to maintain lubrication between the piston skirt and cylinder wall so as to reduce a friction between the cylinder and the piston skirt, reduce loss of power due to friction and heat, improve the output power of internal combustion engine, compressor or the like, reduce the fuel consuming, noise and exhaust, and achieve fuel saving and environment protection.

In order to accomplish the above objects, the present invention provides a piston for internal combustion engine, compressor or the like, wherein the piston comprises a piston ring and a piston skirt having a piston skirt wall.

One or more lubricant channels and reservoirs are provided on an outer surface of the piston skirt. In one embodiment, the lubricant channels are through holes and the lubricant reservoirs are grooves and indentions provided on the piston skirt. The piston skirt grooves and indentions reverse the lubricant while the through holes supply lubricant.

According to the present invention, when the internal combustion engine or the compressor is idle, the piston in the axial direction has no movement. Due to the film tension of the oil film formed between the outer surface of the piston skirt and the cylinder wall, the piston skirt grooves and piston skirt indentions are filled with contracted lubricant. When the engine starts, due to the lubricant reserved and filled in the space between the piston skirt and the cylinder wall, the direct contact of the piston skirt and the cylinder wall is prevented and thus the coefficient of friction of the piston skirt and the cylinder wall is tremendously reduced, resulting in fuel saving and environment protection.

When the piston of internal combustion engine or compressor is moving along the axial direction at high speed, the piston expands because of heat. The piston and the cylinder wall form a preferred clearance as designed to work in the best condition for lubrication and piston alignment. The lubricant constantly flows to the piston skirt through the through holes and is transferred and reserved in the grooves and indentions on the piston skirt, the reserved lubricant also distributes around the piston skirt, so that the lubricant between piston skirt and cylinder wall can always form a fluidic oil film. This will reduce the power loss due to friction and heat and thus improve the output power of internal combustion engine, compressor or the like, reduce the fuel consuming, noise and exhaust, and achieve fuel saving and environment protection.

DETAILED DESCRIPTION OF THE PREFERRED EMBODIMENT

Figure 1:
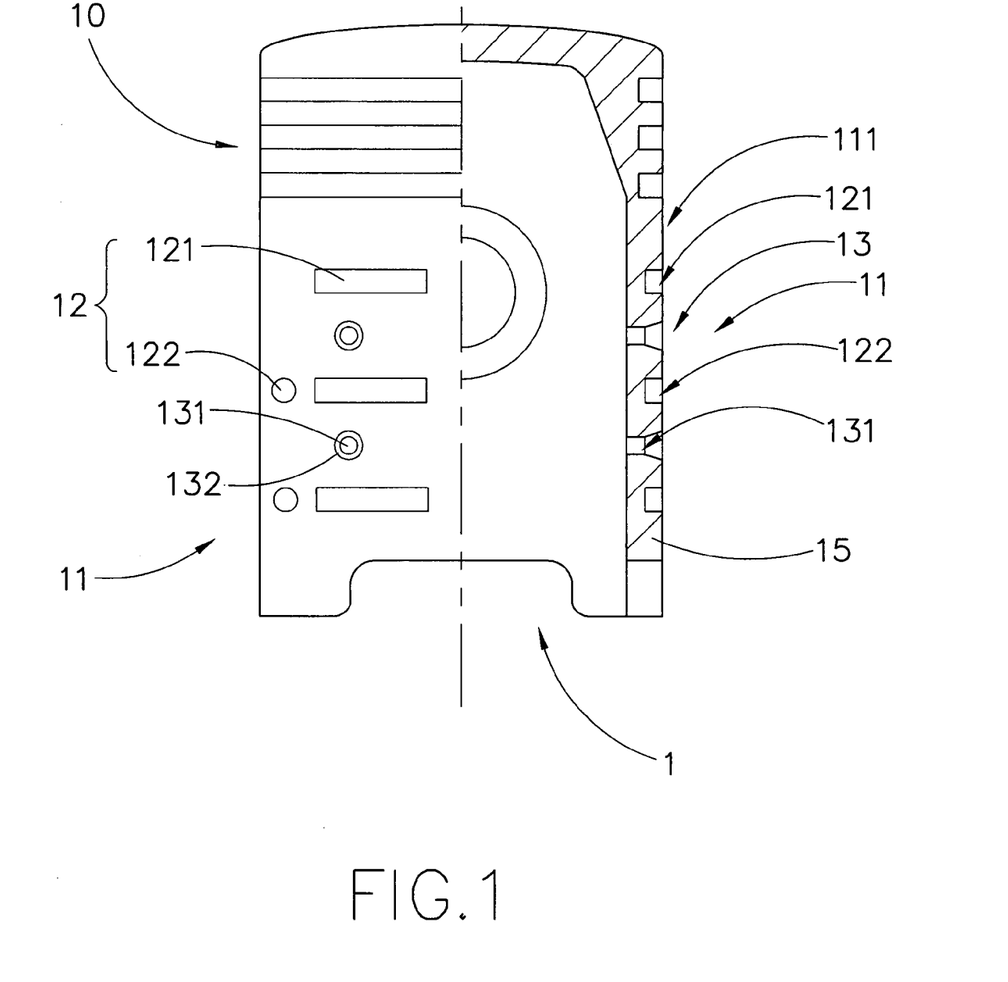
FIG. 1 is a partial sectional view of a piston for internal combustion engine, compressor or the like according to a preferred embodiment of the present invention.
Figure 2:
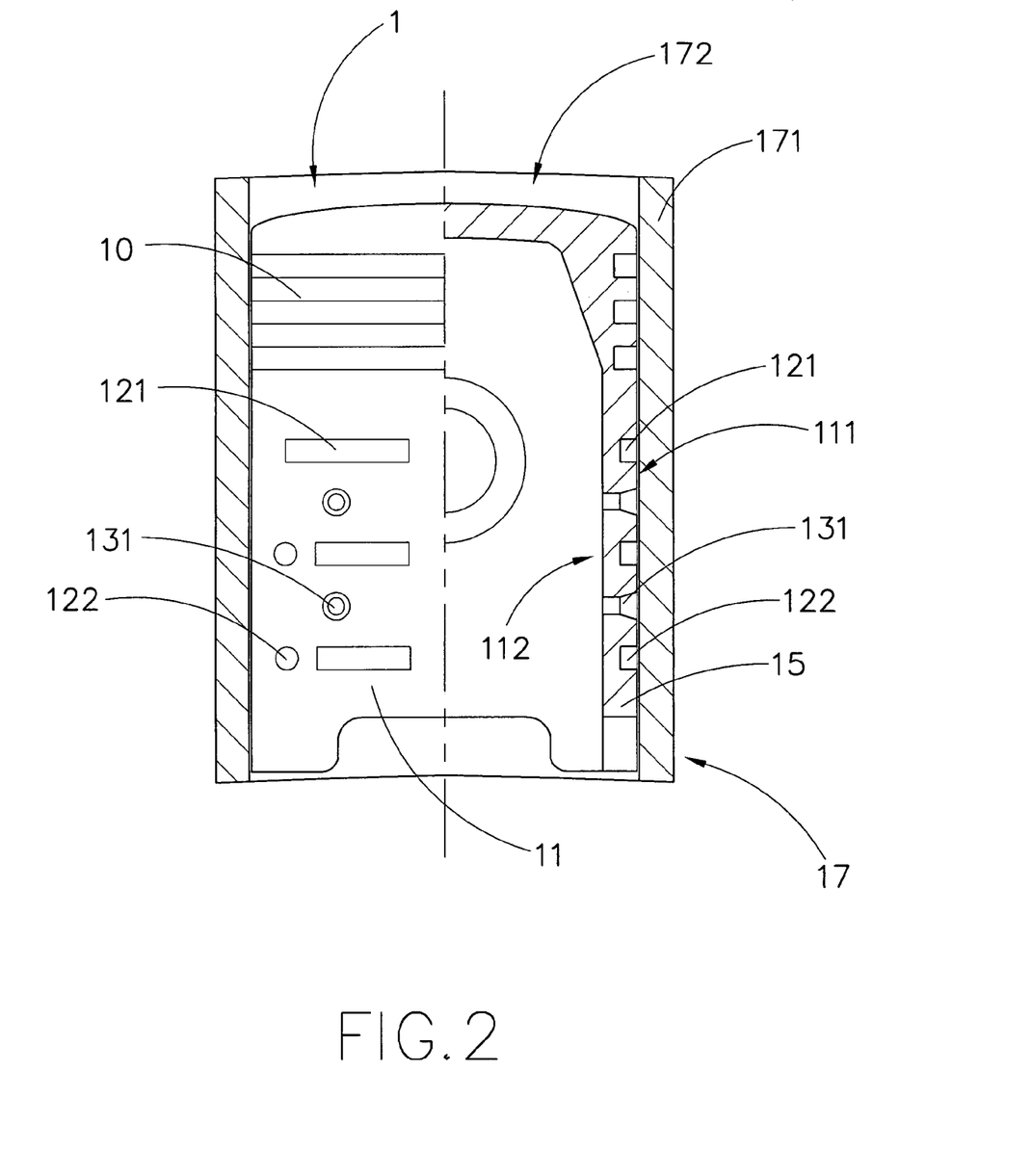
FIG. 2 is a partial sectional view of the piston as shown in FIG. 1 fitted in a cylinder of an internal combustion engine, compressor or the like according to the above embodiment of the present invention.

Referring to FIGS. 1 and 2, a piston 1 for internal combustion engine, compressor or the like according a preferred embodiment of the present invention is illustrated. The piston 1 according to the present invention comprises a piston ring 10 and piston skirt 11 having a piston skirt wall 15. One or more lubricant reservoirs 12 and channels 13 are provided on an outer surface 111 of the piston skirt 11. In one embodiment, the lubricant channels 13 are through holes 131 and the lubricant reservoirs 12 comprise grooves 121 and indentions 122 provided on the piston skirt 11. The piston skirt grooves 121 and indentions 122 are arranged to reverse the lubricant while the through holes 131 supply lubricant.

It is preferable that the elongated grooves 121 are arranged to be extended radially and intervally around the piston skirt 11 and the circular indentions 122 are arranged to be positioned between two opposing ends of the two grooves 121. The through holes 131 are provided all around the outer surface 111 of the piston skirt 11 and adjacent to the lubricant reservoirs 12. Each of the through holes 131 penetrates through the cylindrical piston skirt wall 15 of the piston skirt 11 and transversally extends from an inner surface 112 to the outer surface 111, wherein an enlarged countersink opening 132 is formed at the outer end of each of the through holes 131. Due to the bigger diameter of the opening 132 with respect to that of the through hole 131, a suction effect is achieved to deliver the lubricant in cavity defined by the surrounding inner surface 112 flowing to the opening 132 and the outer surface 111 of the piston skirt 11 when the piston 1 is moving up and down axially along a cylinder 17 of the internal combustion engine, compressor or the like as shown in FIG. 2.

Figure 3:
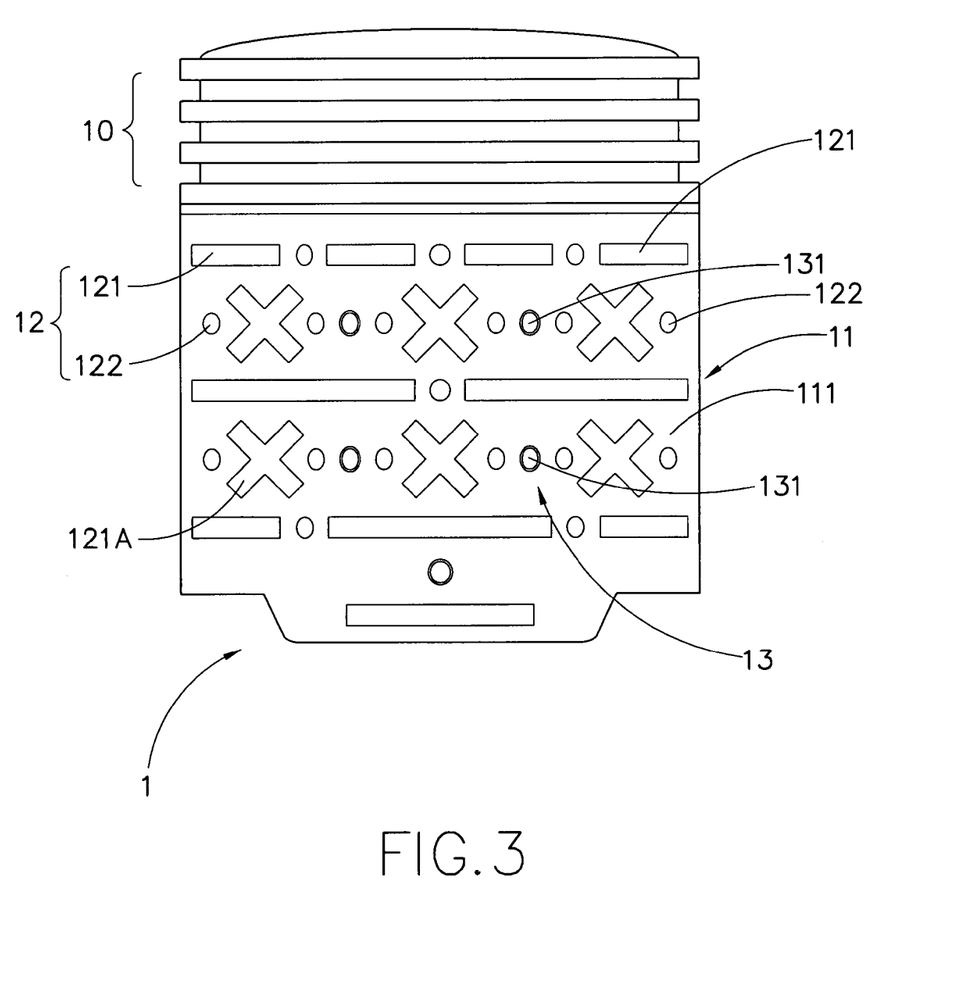
FIG. 3 is a front view of the piston for internal combustion engine, compressor or the like according to an alternative mode of the above preferred embodiment of the present invention.

In order to reserve as much as lubricant on the outer surface 111 of the piston skirt 11, as shown in FIG. 3, the lubricant reservoirs may further comprises cross grooves 121A provided between rows of elongated grooves 121 to hold more lubricant filled therein.

Figure 4:
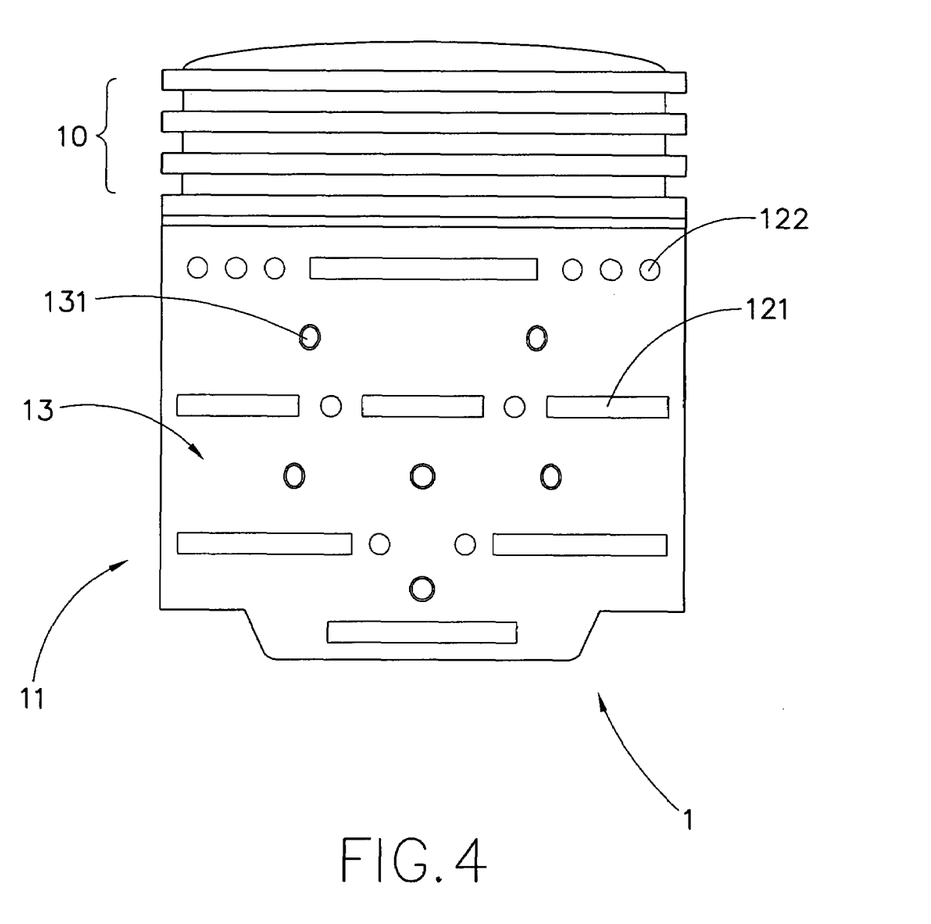
FIG. 4 is a front view of a piston for internal combustion engine, compressor or the like according to another alternative mode of the above preferred embodiment of the present invention, wherein multiple grooves with irregular shapes on the piston skirt are illustrated.

FIG. 4 illustrates alternatively that the grooves 121 and indentions 122 of the lubricant reservoirs 12 on the piston skirt 11 are formed with different shapes, depths, and sizes. The grooves 121 and indentions 122 are located on the piston skirt 11 irregularly. The grooves 121 and indentions 122 are merely indented in the piston skirt 11 which can assure to reserve the lubricant on the surface of the piston skirt 11 efficiently.

Figure 5:
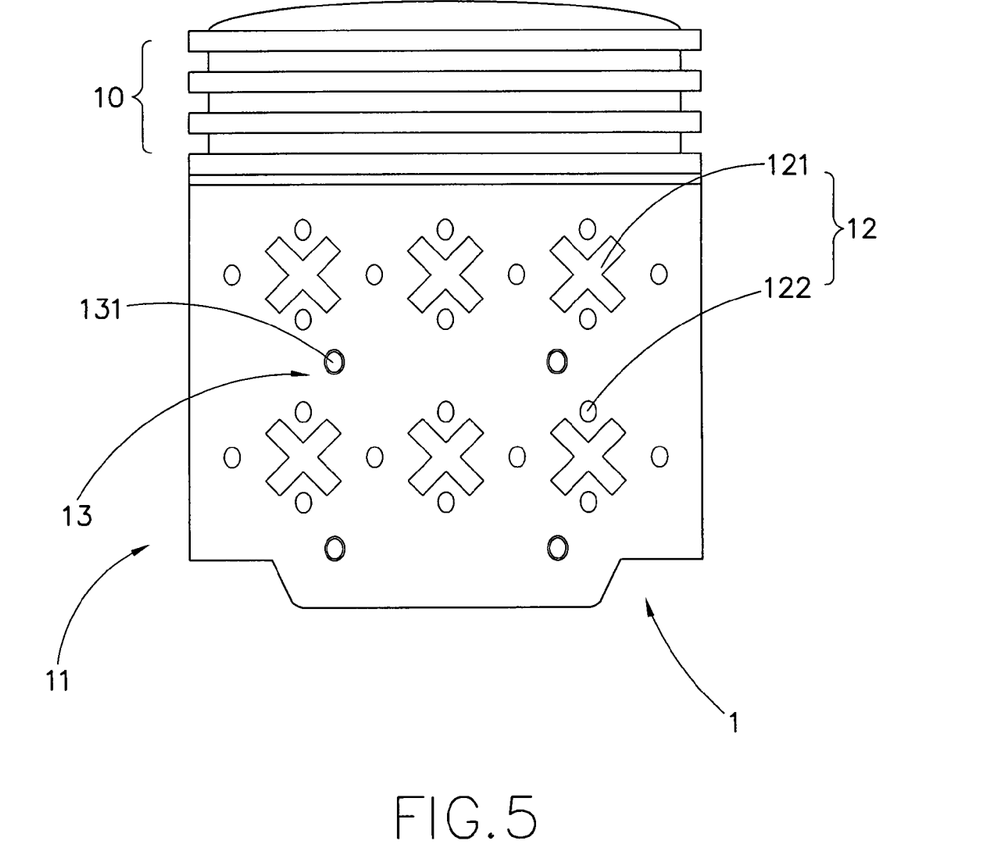
FIG. 5 is a front view of a piston for internal combustion engine, compressor or the like according to an alternative mode of the above preferred embodiment of the present invention, wherein multiple grooves arranged in irregular directions, connected or not connected with each other on the piston skirt are illustrated.

FIG. 5 illustrates alternatively that the multiple grooves 121 are provided on the piston skirt 11 irregularly, wherein one elongated groove 121 may intersect with another groove 121 like the cross grooves 121A as shown in FIG. 3 that enables lubricant flowing between each other while the indentions 122 are provided all around the outer surface 111 of the piston skirt 11 between those intersection grooves 121. This arrangement can provide more effective area of the grooves over the surface of the piston skirt 11, so as to assure the effective area of the oil film between the piston skirt 11 and the cylinder wall 171.

In addition, the through holes 131 which penetrate through the piston skirt wall 15 are located between the intersection grooves 121 and/or indentions 14 so as to ensure the lubricant to reach the surface of the piston skirt 11 rapidly and keep in the skirt grooves 12 and indentions 14.

It is worth mentioning that the indentions 122, which may be located on the piston skirt 11 irregularly with different depths, can substantially compensate the insufficiency of the coverage of the grooves 121 on the piston skirt 11, increase the effective area for reserving the lubricant, maximally increase the oil film area between the piston skirt 11 and the cylinder wall 171, and prevent the direct metal contact of the outer surface 111 of the piston skirt 11 and the cylinder wall 171.

Figure 6:
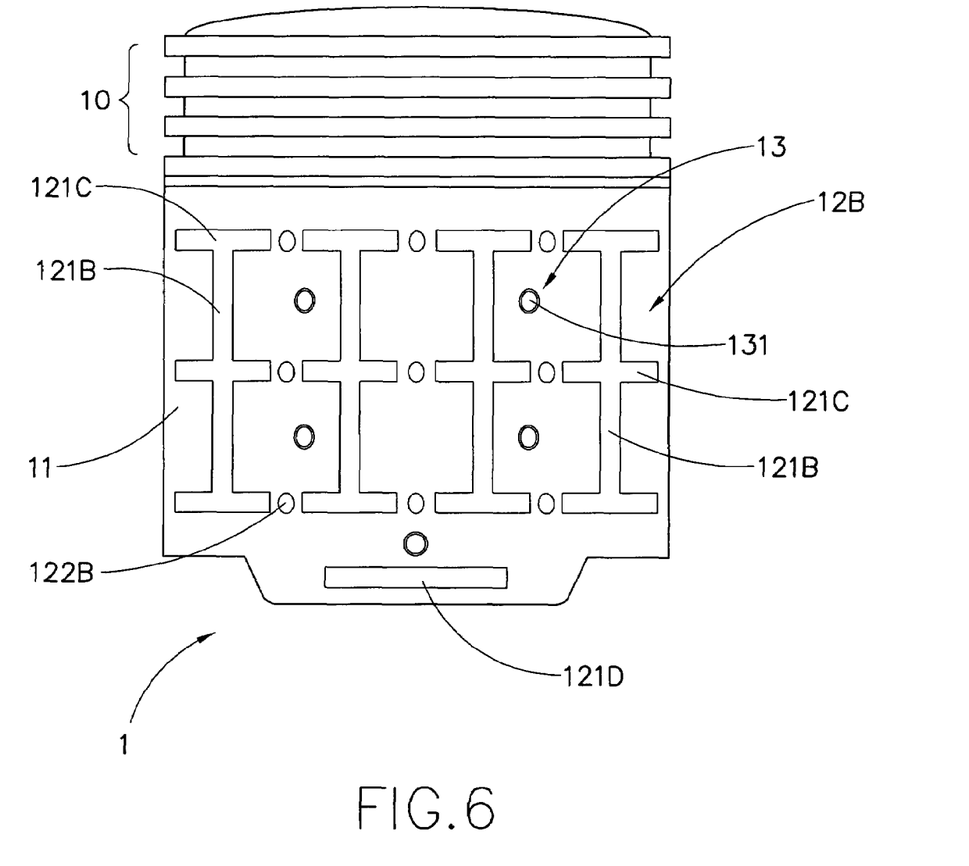
FIG. 6 is a front view of a piston for internal combustion engine, compressor or the like according to another alternative mode of the above preferred embodiment of the present invention, wherein multiple grooves arranged in axial direction on the piston skirt and not connected with the circumferential groove at bottom of the piston skirt are illustrated.

FIG. 6 illustrates alternatively that each of the lubricant reservoirs 12B comprises a longitudinal groove 121B extended along an axial direction on the outer surface 111 of the piston skirt 11 and one or more radial groove 121C provided across the longitudinal groove 121B. One or more elongated bottom grooves 121D are radially extended at a bottom portion of the outer surface 111 of the piston skirt 11 with no intersection with other grooves 121B and 121C. Accordingly, when the lubricant is reserved in the grooves 121B, 121C, 121D, a lubricant mesh is formed on the piston skirt 11. Since the longitudinal grooves 1211B are not connected with the bottom grooves 121D, lubricant reserved on the outer surface 111 is thus prevented to flow away so as to ensure sufficient lubricant is stored and distributed between the cylinder wall 171 and the piston skirt 11.

Referring to FIGS. 1 to 6, it is appreciated that the size, shape and depth of the lubricant reservoirs 12 and the size and shape of the lubricant channels 13 formed on the outer surface 111 of the piston skirt 11 can be designed to meet different achievements and applications. Each of the pistons 1 as shown in FIGS. 1-6 is able to be functioned in the cylinder 17 while reducing the friction between the piston 1 and the cylinder wall 171 of the cylinder 17 of an internal combustion engine, a compressor or the like with the following steps:

(a) conducting lubricant to the outer surface 111 of the piston skirt 11 of the piston 1 through the lubricant channels 13 communicating the inner surface 112 of the piston skirt 11 with the outer surface 111 thereof; and (b) reserving lubricant in the lubricant reservoirs 12 provided on the outer surface 111 of the piston skirt 11 to maintain lubrication between the piston skirt 11 and cylinder wall 171 so as to reduce a friction between the cylinder wall 171 and the piston skirt 11, reduce loss of power due to friction and heat, improve the output power of internal combustion engine, compressor or the like, reduce the fuel consuming, noise and exhaust, and achieve fuel saving and environment protection.

When the internal combustion engine or the compressor is working, the piston 1 is moving reciprocally within the cylinder chamber 172 defined by the cylinder wall 171 of the cylinder 17 at high speed and, at the same time, constantly conducting lubricant to flow to the outer surface 111 of piston skirt 11 through the lubricant channels 13, i.e. the through holes 131, of the piston skirt 11, wherein such lubricant is reserved in the lubricant reservoirs 12, i.e. the grooves 121 and the indentions 122, indented on the outer surface 111 of the piston skirt 11 and thus supplying sufficient amount of lubricant between the cylinder wall 171 and the outer surface 111 of the piston skirt 11.

Accordingly, oil film is maintained between the cylinder wall 171 and the outer surface 111 of the piston skirt 11 to prevent direct metal contact of the piston 1 with the cylinder 17, so that the friction of the cylinder wall 171 and the piston skirt 11 is reduced and the lateral force and the tension of the piston skirt 11 are also decreased. The present invention not only improves the wear resistance and the thermal stability of the piston 1 but also enables a steady alignment and good sealability. That substantially reduces the power loss due to friction and heat, improve the output power of internal combustion engine, compressor or the like, reduce the fuel consuming, noise and exhaust, and thus achieve fuel saving and environment protection.

According to the present invention, the piston 1 can be applied in various fields including internal combustion engines for land and water vehicles, tanks, generators, mile machines, and etc. The piston may also utility in compressors for air conditioners, air compressors, industrial cooling compressors, and etc.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A piston for performing a reciprocal movement in a cylinder having a cylinder wall with a predetermined amount of lubricant, comprising:

a piston ring and a piston skirt having a piston skirt wall having an outer surface, an inner surface and a cavity defined by said surrounding inner surface, a plurality of lubricant reservoirs including a plurality of grooves and indentions indented all around said outer surface of said piston skirt wall, wherein each of said grooves has a length shorter than a circumference of said piston skirt and is extended radially and intervally around said piston skirt wall, wherein said indentions are arranged to be positioned between said grooves to compensate a coverage of said grooves and increase an effective area for reserving said lubricant, and a plurality of lubricant channels which are through holes spacedly provided all around said outer surface of said piston skirt and adjacent to said grooves and indentions, wherein each of said through holes extends from an inner surface to said outer surface of said piston skirt wall and has an enlarged countersink opening formed at an outer end thereof, whereby a suction effect is achieved to deliver said lubricant in said cavity flowing to said opening on said outer surface when said piston is moving up and down axially along said cylinder so as to ensure said lubricant reaching said outer surface rapidly and retaining in said grooves and indentions for effectively and continuously forming a film of said lubricant between said outer surface of said piston skirt and said cylinder wall of said cylinder, wherein said indentions provided between said grooves maximally increase an oil film area between said piston skirt and said cylinder wall.

2. The piston, as recited in claim 1, wherein each of said indentions is positioned between two opposing ends of two of said grooves.

3. The piston, as recited in claim 1, wherein said grooves include grooves in elongated shape.

4. The piston, as recited in claim 1, wherein said grooves are in cross shape.

5. The piston, as recited in claim 3, wherein said grooves include grooves in cross shape positioned between rows of said elongated grooves.

6. The piston, as recited in claim 4, wherein said through holes penetrated through said piston skirt wall are located between said cross grooves.

7. The piston, as recited in claim 1, wherein said grooves include longitudinal grooves extended along an axial direction on said outer surface and one or more radial grooves provided across said longitudinal grooves.

8. The piston, as recited in claim 7, wherein said grooves further include one or more elongated bottom grooves radially extended at a bottom portion of said outer surface without intersection with said other grooves in such a manner that when said lubricant is reserved in said grooves, a lubricant mesh is formed on said piston skirt, and that since said longitudinal grooves are not connected with said bottom grooves, said lubricant reserved on said outer surface is prevented to flow away so as to ensure sufficient said lubricant storing and distributing between said cylinder wall and said piston skirt.

9. A method of continuously forming a film of lubricant between a cylinder wall of a cylinder and a piston skirt of a piston reciprocally received in said cylinder, comprising the steps of:

(a) spacedly providing a plurality of grooves indented all around an outer surface of said piston skirt wall, wherein said grooves are arranged to be extended radially and intervally around said piston skirt wall;

(b) providing a plurality of indentions indented around said outer surface of said piston skirt wall and arranged to be positioned between said grooves to compensate a coverage of said grooves and increase an effective area for reserving said lubricant;

(c) spacedly providing a plurality of lubricant channels all around an outer surface of said piston skirt, which are through holes penetrated from an inner surface to said outer surface of said piston skirt wall of said piston skirt;

(d) producing a suction effect by means of enlarged countersink openings formed at outer ends of said through holes respectively surface when said piston is moving up and down axially along said cylinder, and delivering said lubricant in a cavity defined by said surrounding inner wall of said piston skirt flowing to said openings on said outer surface due to said suction effect;

(e) retaining said lubricant delivered through said through holes in said grooves and indentions in a maximum period of time when said piston is moving in said cylinder in a reciprocal manner; and (f) forming a film of said lubricant between said outer surface of said piston skirt and said cylinder wall of said cylinder while said piston is moving reciprocally within said cylinder by ensuring an adequate and continuous supply of said lubricant to be retained in said grooves and indentions so as to substantially reduce said friction between said piston skirt and said cylinder wall.

10. The method, as recited in claim 9, wherein each of said indentions is positioned between two opposing ends of two of said grooves.

11. The method, as recited in claim 9, wherein said grooves include grooves in elongated shape.

12. The method, as recited in claim 9, wherein said grooves are in cross shape.

13. The method, as recited in claim 11, wherein said grooves include grooves in cross shape positioned between rows of said elongated grooves.

14. The method, as recited in claim 12, wherein said through holes penetrated through said piston skirt wall are located between said cross grooves.

15. The method, as recited in claim 9, wherein said grooves include longitudinal grooves extended along an axial direction on said outer surface and one or more radial grooves provided across said longitudinal grooves.

16. The method, as recited in claim 15, wherein said grooves further include one or more elongated bottom grooves radially extended at a bottom portion of said outer surface without intersection with said other grooves in such a manner that when said lubricant is reserved in said grooves, a lubricant mesh is formed on said piston skirt, and that since said longitudinal grooves are not connected with said bottom grooves, said lubricant reserved on said outer surface is prevented to flow away so as to ensure sufficient said lubricant storing and distributing between said cylinder wall and said piston skirt.

* * * * *